(12) United States Patent
Fukawa

(10) Patent No.: US 7,036,963 B2
(45) Date of Patent: May 2, 2006

(54) VEHICLE LIGHT APPARATUS

(75) Inventor: Kiyotaka Fukawa, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 224 days.

(21) Appl. No.: 10/262,085

(22) Filed: Oct. 2, 2002

(65) Prior Publication Data

US 2003/0067762 A1   Apr. 10, 2003

(30) Foreign Application Priority Data

Oct. 4, 2001 (JP) ............................ P.2001-308348

(51) Int. Cl.
*B60Q 1/08* (2006.01)
(52) U.S. Cl. ....................... 362/465; 362/464; 362/466; 362/468
(58) Field of Classification Search ................. 362/464, 362/465, 466, 468, 469, 37, 40, 53, 54
See application file for complete search history.

(56) References Cited

U.S. PATENT DOCUMENTS

| 5,404,278 | A | * | 4/1995 | Shibata et al. ............... 362/464 |
| 5,660,454 | A | * | 8/1997 | Mori et al. ................... 362/466 |
| 5,909,949 | A |   | 6/1999 | Gotoh |
| 6,805,472 | B1 | * | 10/2004 | Fukawa ....................... 362/466 |

FOREIGN PATENT DOCUMENTS

| CN | 1172741 A | 2/1998 |
| DE | 195 49 077 A1 | 7/1996 |
| DE | 197 21 095 A1 | 11/1997 |
| DE | 197 56 574 A1 | 10/1998 |
| DE | 197 55 406 C2 | 7/2001 |
| JP | 6-15314 B2 | 3/1994 |

\* cited by examiner

*Primary Examiner*—Sandra O'Shea
*Assistant Examiner*—Anabel Ton
(74) *Attorney, Agent, or Firm*—Sughrue Mion, PLLC

(57) ABSTRACT

A vehicle light apparatus comprises a controller 10 for changing a lighting range of a lamp L for illuminating a forward part of a vehicle corresponding to a steering angle of the vehicle and for controlling the lighting range of lighting means corresponding to a steering angular velocity of the vehicle. Alternatively, there is provided lighting range control means for changing a lighting range of lighting means for illuminating a forward part of the vehicle corresponding to a steering angle of the vehicle and for controlling the lighting range of the lighting means based on an operation of a turn signal lamp of the vehicle. It is possible to decide a running condition of the vehicle from the steering angular velocity or the operation state of the turning signal lamp and a vehicle speed, thereby rapidly controlling a change in the lighting direction or the lighting area of the lamp L in a running direction. Consequently, it is possible to carry out an illumination in the running direction prior to a steering operation. Thus, it is effective for maintaining the safe running of the vehicle on a curved road and an intersection road.

19 Claims, 10 Drawing Sheets

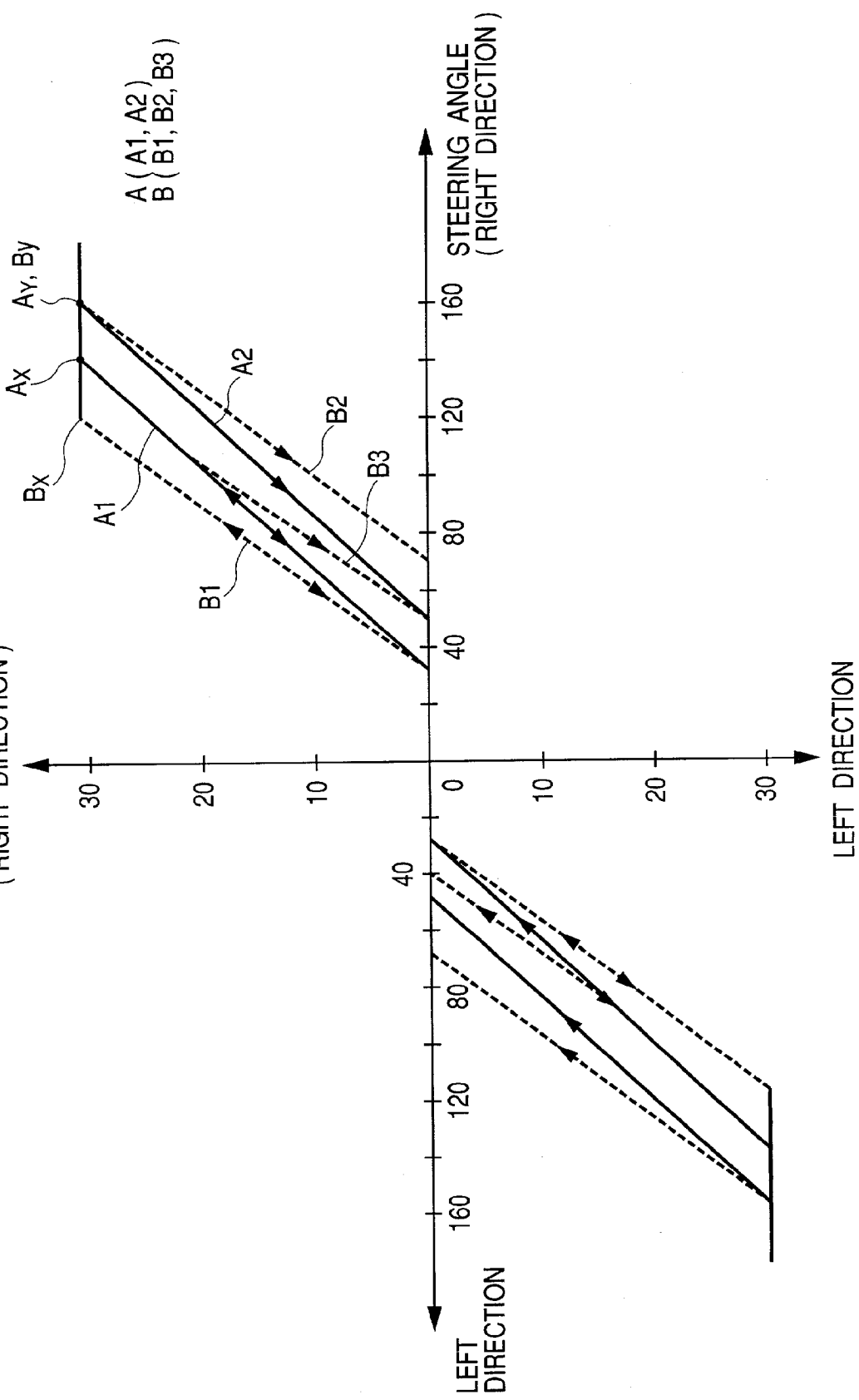

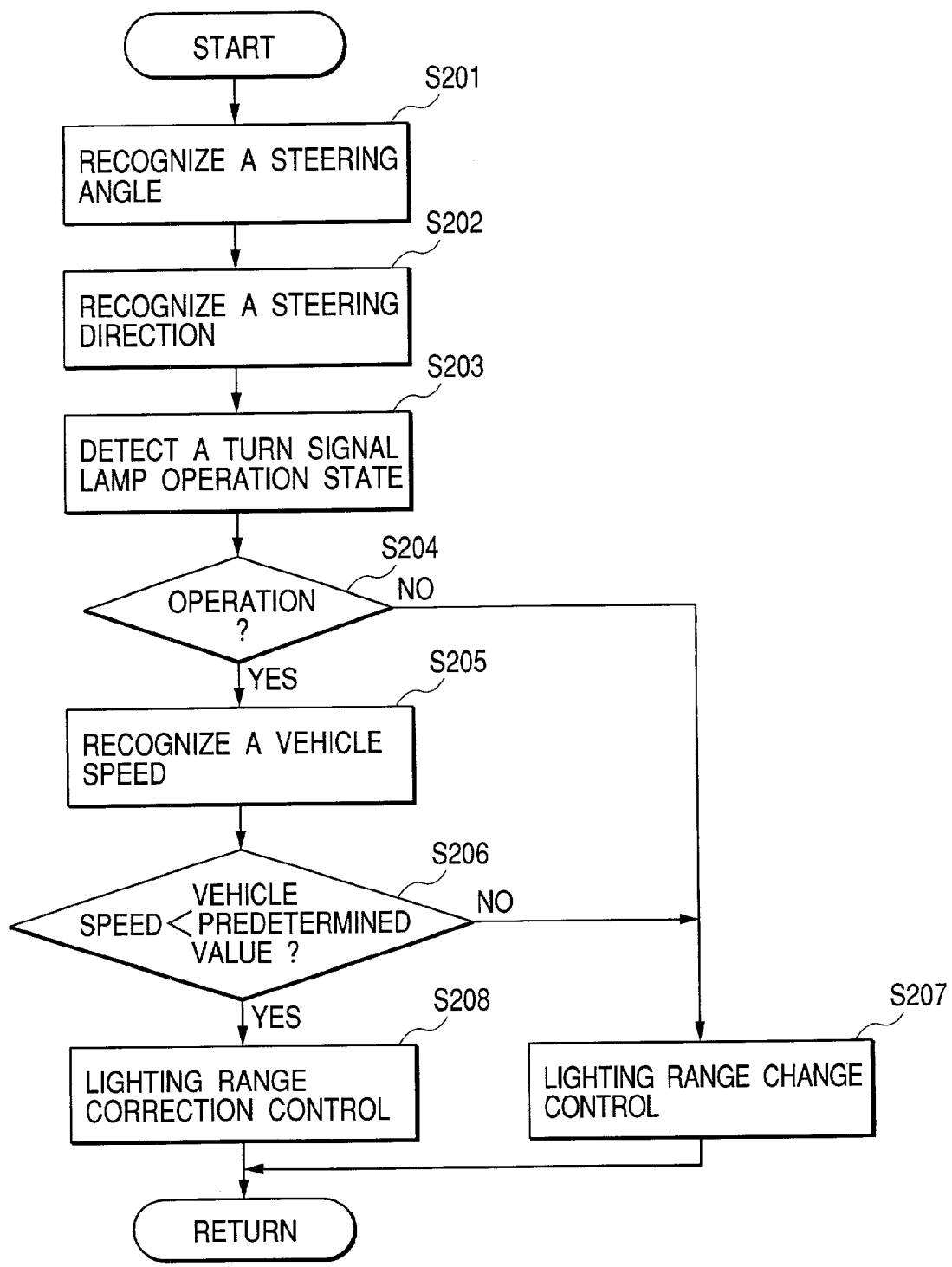

FIG. 10A
FIG. 10B
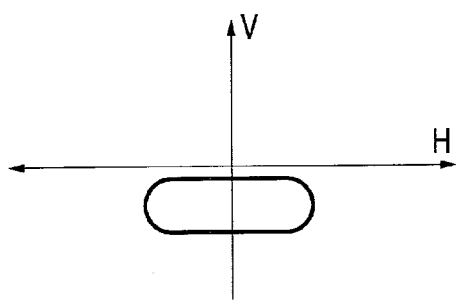
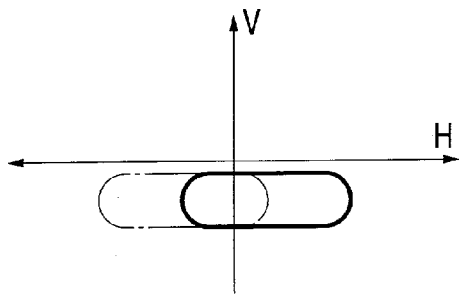
FIG. 11A
FIG. 11B
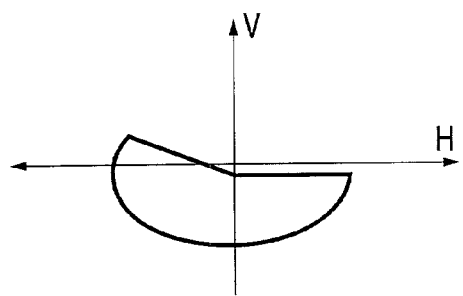
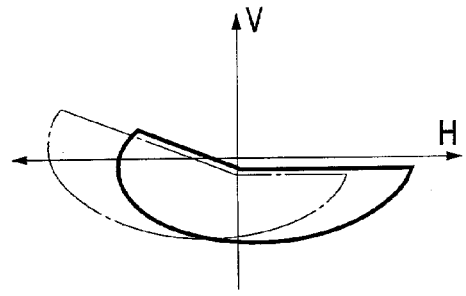
FIG. 12A
FIG. 12B
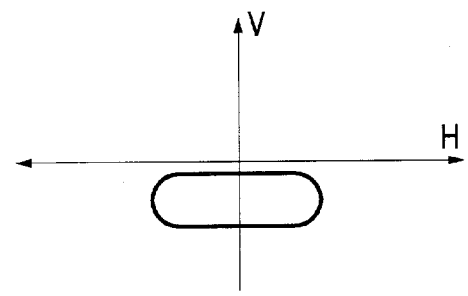
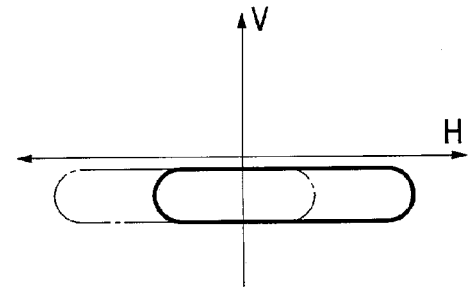

VEHICLE LIGHT APPARATUS

BACKGROUND OF THE INVENTION

The present invention relates to a lighting apparatus such as a headlamp or a fog lamp which illuminates the forward part of a vehicle such as a car, and more particularly to a vehicle light apparatus which has the function of controlling a change in a lighting direction or a lighting area of a lamp light corresponding to a running situation and can properly carry out lighting in order to realize the safe running of the vehicle.

In order to enhance the running safety of a car, it is necessary to illuminate the running direction of a vehicle. A lamp for illuminating the forward part of a car such as a conventional headlamp or fog lamp of the car is constituted to carry out an illumination in the straight running direction of the car. In the case in which the car changes a course direction on an intersection road (a T-shaped road, a crossroad and so forth) or a curved road (an S-shaped road, a U-shaped road and so forth), therefore, the forward part of a course to be changed cannot be illuminated previously and a forward confirmation is carried out insufficiently so that there is a problem in respect of safe running. For such a problem, there has been proposed a lighting apparatus in which a lighting range, that is, a lighting direction or a lighting area of a lamp is changed according to the steering operation of a car. For example, a lighting optical axis to be the lighting direction of a lamp for illuminating the forward part of a car can be changed transversely or a lighting area to be a range in which the lamp can carry out lighting can be changed, and furthermore, a steering angle (a steering angle of a steering wheel) which is closely related to the running direction of the car can be detected by a steering sensor for detecting the rotating angle of a steering wheel, for example, and the lighting direction of the lamp can be turned in the running direction of the car based on the detection output of the steering sensor or the lighting area can be enlarged in the running direction. Thus, the running direction of the car on an intersection road or a curved road can be illuminated previously, which is effective for safe running.

However, the conventional lighting apparatus serves to simply control the lighting range according to a steering angle. For this reason, it is hard to carry out a proper lighting control to cope with various running situations of a car in some cases. For example, in the case in which the car is running on a curved road having a small radius of curvature, it is desirable that a driver should confirm the situation of a curved road in a course earlier than the execution of a steering operation. In the conventional lighting apparatus in which the lighting range depends on the steering angle, however, it is hard to enlarge the lighting range in a greater angular direction than an angle corresponding to the steering angle and the situation of the curved road of the course cannot be confirmed sufficiently in some cases. Also in the case in which a right turn or a left turn is made on an intersection road, the same operation is carried out. On the other hand, when a lighting range is controlled and is thereby changed in the case in which the steering operation is carried out for a lane change during running at a high speed, the illumination of a self-lane in the straight running direction of the car becomes insufficient so that a problem arises in respect of high-speed safe running.

SUMMARY OF THE INVENTION

It is an object of the invention to provide a vehicle light apparatus which can automatically carry out a proper control of a lighting range corresponding to the steering operation of the vehicle, thereby performing a preferable illumination for the safe running of the vehicle.

A first aspect of the invention is directed to a vehicle light apparatus comprising lighting range control means for changing a lighting range of lighting means for illuminating a forward part of the vehicle corresponding to a steering angle of the vehicle and for controlling the lighting range of the lighting means corresponding to a steering angular velocity of the vehicle.

A second aspect of the invention is directed to a vehicle light apparatus comprising lighting range control means for changing a lighting range of lighting means for illuminating a forward part of the vehicle corresponding to a steering angle of the vehicle and for controlling the lighting range of the lighting means based on an operation of a turn signal lamp of the vehicle.

In the invention, the lighting range control means serves to control at least one of a lighting direction and a lighting area of the lighting means, thereby controlling a change in the lighting range of the lighting means.

According to the first aspect of the invention, the lighting range control means is set to increase a change speed of the lighting range of the lighting means for a change in the steering angle when the steering angular velocity is greater than a predetermined value as compared with the case in which the steering angular velocity is smaller than the predetermined value. Alternatively, the lighting range control means is set to increase a change angle of the lighting direction of the lighting means for a change in the steering angle when the steering angular velocity is greater than a predetermined value as compared with the case in which the steering angular velocity is smaller than the predetermined value.

According to the second aspect of the invention, the lighting range control means is set to increase a change angle of the lighting direction of the lighting means for a change in the steering angle when the turn signal lamp carries out a direction indicating operation as compared with the case in which it does not carry out the direction indicating operation. In this case, the lighting range control means stops an operation for increasing a change angle of the lighting direction when a speed of the vehicle is equal to or higher than a predetermined speed.

According to the invention, a change in the lighting direction or the lighting area of the lamp can be controlled according to the steering angle, and furthermore, the running condition of the vehicle can be decided based on the steering angular velocity or the operation state of the turn signal lamp and the vehicle speed to rapidly control the change in the lighting direction or the lighting area of the lamp in the running direction. In the case in which the running direction of the vehicle is to be changed, therefore, the running direction can be illuminated prior to the steering operation. Consequently, the invention is very effective for maintaining the safe running of the vehicle on a curved road and an intersection road.

BRIEF DESCRIPTION OF THE DRAWINGS

FIG. 7 is a chart showing a correlation between a steering angle and a lighting direction;

FIG. 9 is a flow chart for explaining another example of the lighting range control operation;

FIGS. 10A and 10B are light distribution characteristic charts in the case of application to a fog lamp;

FIGS. 11A and 11B are light distribution characteristic charts showing different lighting range control operations in the case of application to a headlamp;

FIGS. 12A and 12B are light distribution characteristic charts showing different lighting range control operations in the case of the application to the fog lamp.

DETAILED DESCRIPTION OF THE PREFERRED EMBODIMENTS

Figure 1:
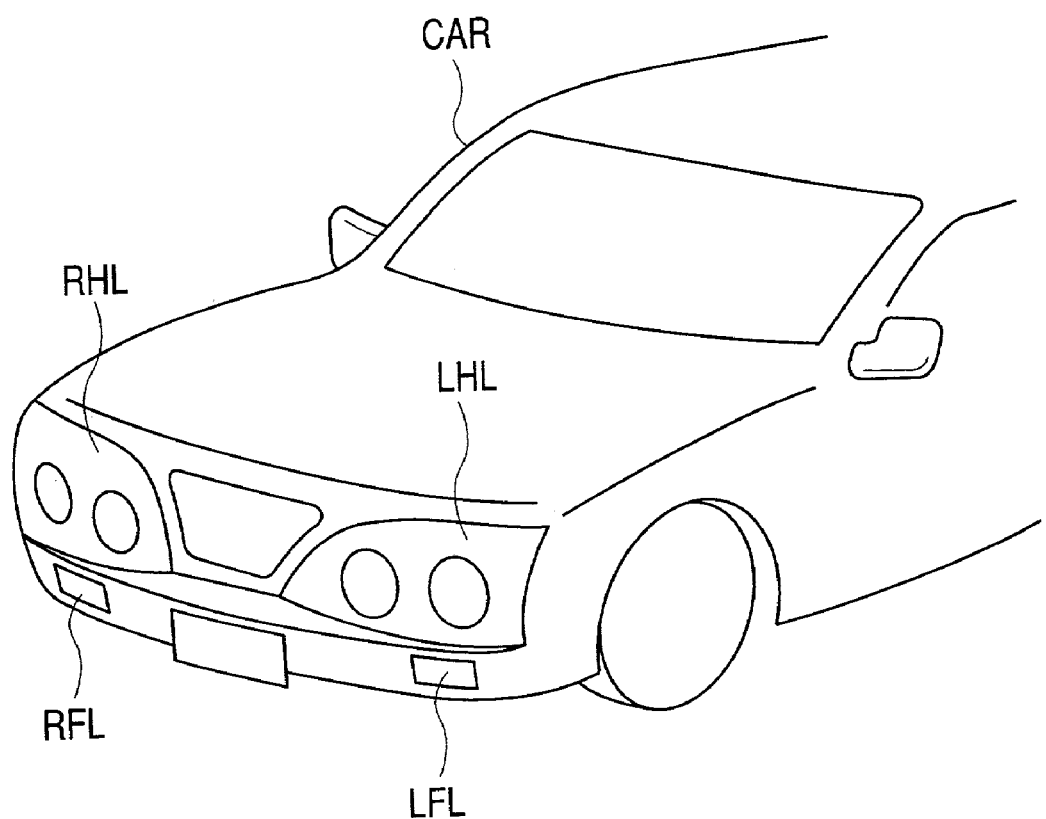
FIG. 1 is a schematic perspective view showing the forward part of a car to which a lighting apparatus according to the invention is applied.

Next, embodiments of the invention will be described with reference to the drawings. FIG. 1 is a schematic view showing a car to which a vehicle light apparatus according to the invention is applied. A left headlamp LHL and a right headlamp RHL are provided on the left and right in the front part of a body of a car CAR, respectively. Moreover, a left fog lamp LFL and a right fog lamp RFL are provided in lower positions of the headlamps of the body. These lamps have lamp components such as a lamp body, a light source and a reflector which are not particularly restricted, and include a lighting range control mechanism for changing the lighting range thereof as will be described below. Examples of the lighting range control mechanism include a mechanism for controlling a transverse change in the direction of the optical axis of the lamp to be a lighting direction, and a mechanism for controlling a change in the irradiation area of the lamp to be a lighting area. In particular, it is a matter of course that the mechanism capable of controlling a change in the lighting area of the lamp can carry out such a control as to satisfy a light distribution characteristic required for each of a high beam and a low beam in each headlamp. In the light distribution characteristic of the low beam, it is possible to enlarge or reduce the lighting area in a transverse direction. Also in a fog lamp, moreover, it is possible to enlarge or reduce the lighting area in the transverse direction.

Figure 2A:
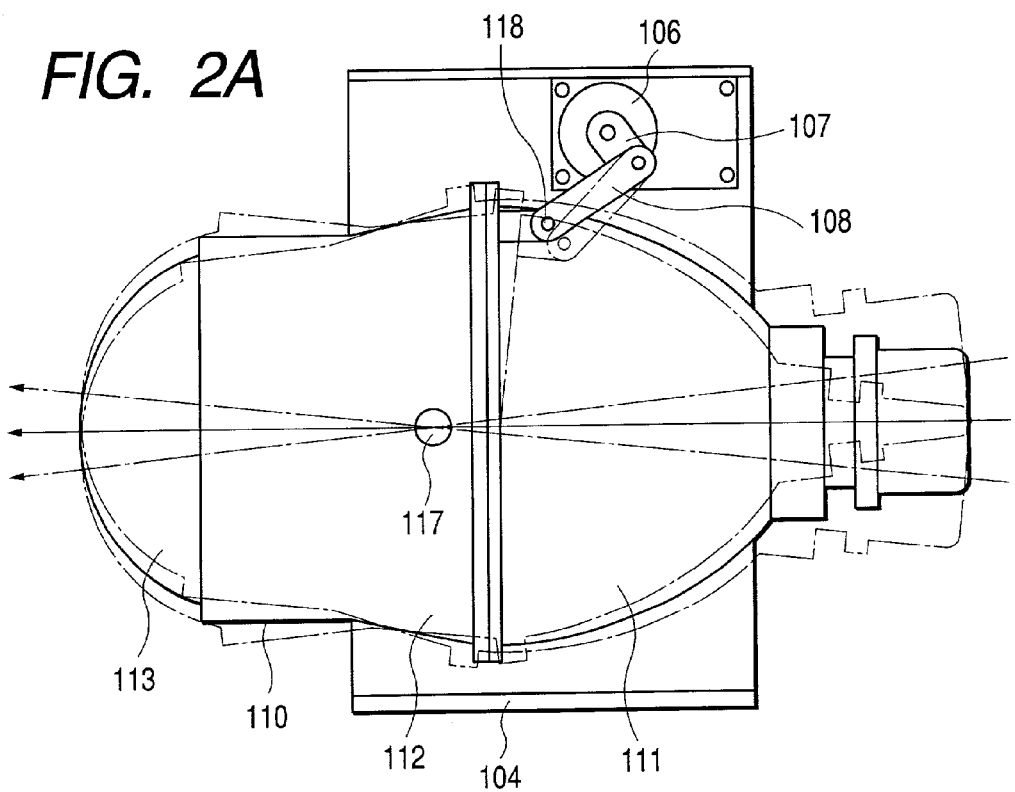
FIGS. 2A and 2B are a plan view and a longitudinal sectional view showing a projector type lamp.
Figure 2B:
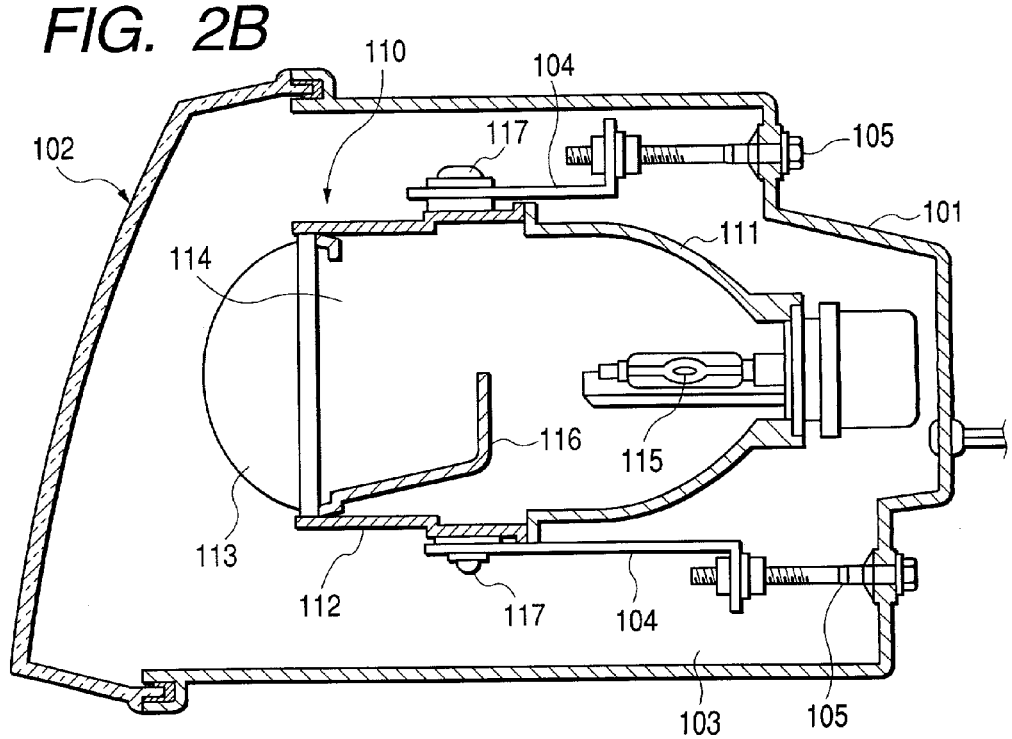

FIGS. 2A and 2B are a plan view and a longitudinal sectional view showing a schematic structure in the case in which the headlamp or the fog lamp is constituted by a projector type lamp and the mechanism for controlling a change in the direction of an optical axis is provided as the lighting range control mechanism of the lamp. More specifically, a projector lamp 110 is provided in a lamp housing 103 constituted by a container-shaped lamp body 101 having a front part opened and a transparent cover 102 attached to the front opening of the lamp body. In the projector lamp 110, a lamp housing 114 is formed by a reflector 111 taking the shape of a parabolic of revolution and having an inner part mirror finished as is well known, a cylindrical holder 112 attached to the front opening of the reflector 111, and a condensing lens 113 attached to the front end of the holder 112, a discharge bulb 115 to be a light source is supported on the reflector in the lamp housing 114, and a shade 116 for shielding a part of a light emitted from the discharge bulb 115 to obtain a required light distribution characteristic is supported on the holder 112.

The projector lamp 110 has pivot shafts 117 erected on the upper and lower surfaces of the holder 112, and is pivotally supported on support frames 104 provided along the internal wall of the lamp housing 103 with the pivot shafts 117 and can be tilted in a transverse direction over a horizontal plane by using the pivot shafts 117 as a fulcrum. In the embodiment, the support frames 104 are supported with screws 105 in two upper and lower portions with respect to the lamp body 101 respectively and the support frame 104 is tilted in a vertical direction in a vertical plane by manually adjusting the screws 105 so that the optical axis of the projector lamp 110 can be changed in the vertical direction.

Moreover, a motor 106 having a rotating shaft in the vertical direction is fixed into the support frame 104 and a crank 107 is integrally attached to the rotating shaft of the motor 106, and the tip portion of the crank 107 and a pin shaft 118 provided on a part of the upper surface of the projector lamp 110 are coupled to each other through a connecting arm 108. Consequently, a lighting direction control mechanism is constituted and rotating force applied by driving the motor 106 is transmitted to the projector lamp 110 through the crank 107 and the connecting arm 108, and the projector lamp 110 is tilted in a transverse direction around the pivot shaft 117 as shown in a broken line of FIG. 2A so that a change in the direction of the optical axis can be controlled in the transverse direction.

Figure 3A:
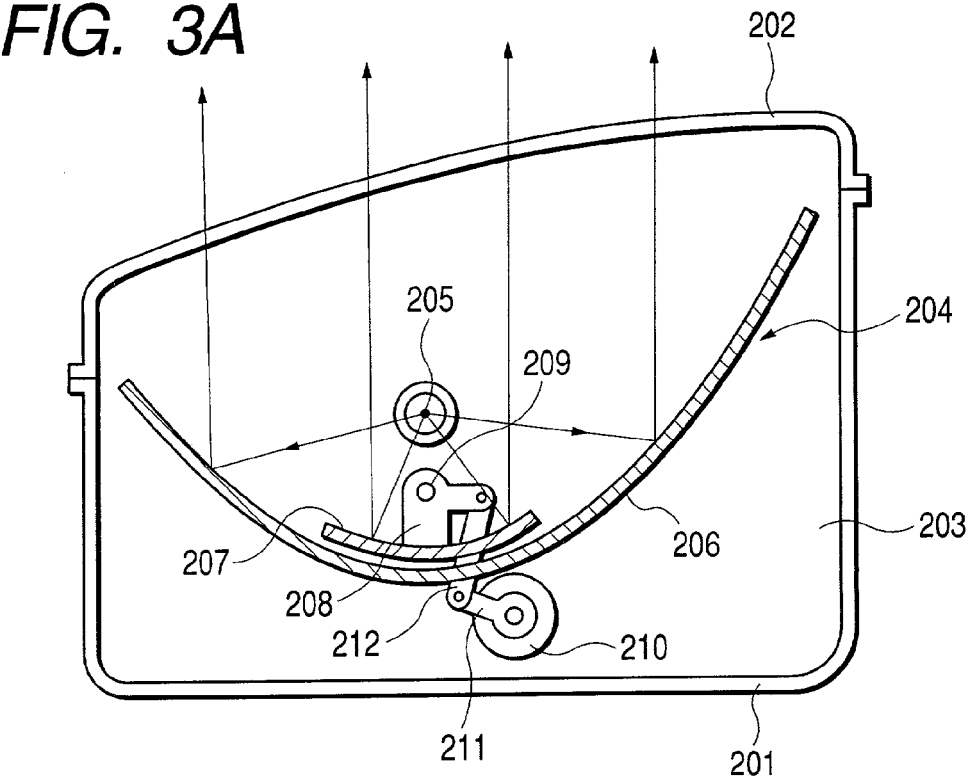
FIGS. 3A and 3B are cross-sectional views showing a reflector type lamp.

FIG. 3A is a cross-sectional view showing a schematic structure in the case in which the headlamp or the fog lamp is constituted by a reflector type lamp and a mechanism for controlling a change in a lighting area is provided as the lighting range control mechanism of the lamp. More specifically, a reflector 204 and a bulb 205 to be a light source are provided in a lamp housing 203 constituted by a container-shaped lamp body 201 having a front part opened and a lens 202 attached to the front opening of the lamp body 201, and a light emitted from the bulb 205 is reflected by the reflector 204 and an illumination is carried out in a required lighting area through the lens 202. The reflector 204 is constituted by a main reflector 206 and a subreflector 207 provided to overlap with a partial area in a position on the internal surface side of the main reflector 206 and supported on a support arm 208 which is rotatable in a horizontal direction around a shaft 209 provided in the vicinal position of the bulb.

Figure 3B:
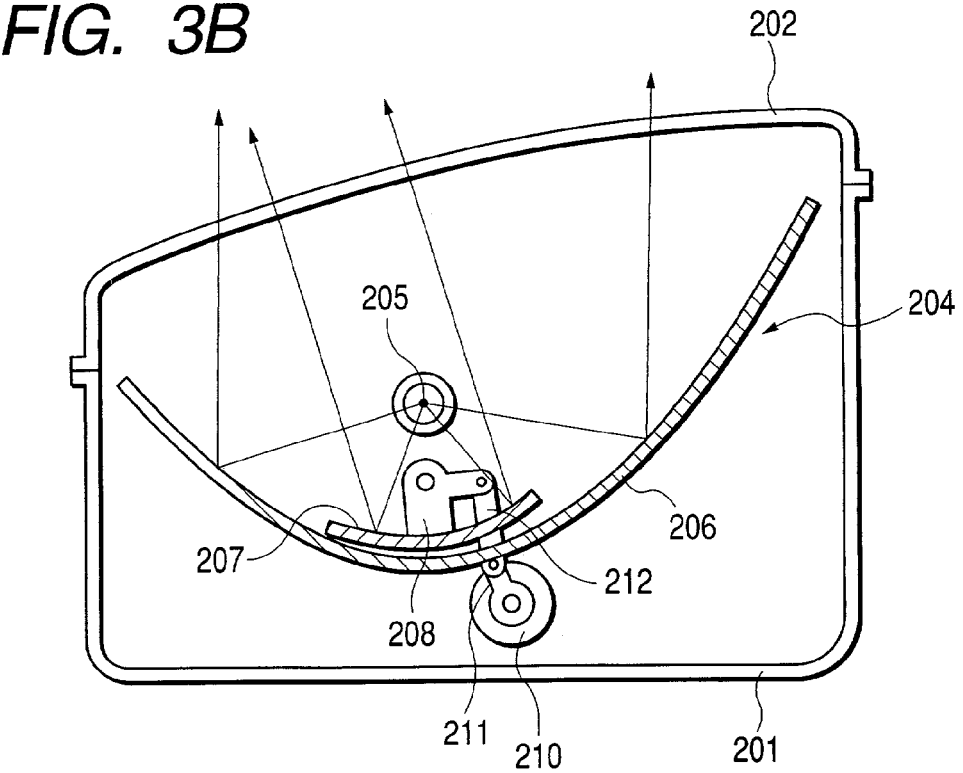

The main reflector 206 is fixedly provided in the lamp body 201. The subreflector 207 is tilted within a small angle range in a transverse direction in a horizontal plane around the shaft 209 by the rotating operation of a motor 210 provided in the lamp body 201 by means of a lighting area control mechanism comprising the motor 210, a crank 211 integrated with the rotating shaft of the motor 210 and a connecting arm 212 for connecting the tip of the crank 211 with a part of the support arm 208. As shown in FIG. 3(b), consequently, the motor 210 is rotated to control the tilt angle of the subreflector 207 so that the light which is emitted from the bulb 205 and is reflected by the subreflector 207 is deflected in a left or right direction with respect to the optical axis of the main reflector 206 according to the tilt angle of the subreflector 207 and the deflected light is integrated with the light reflected by the main reflector 206. Thus, the change control can be carried out in such a manner that the lighting area of the whole lamp is enlarged and reduced in the transverse direction.

Figure 4:
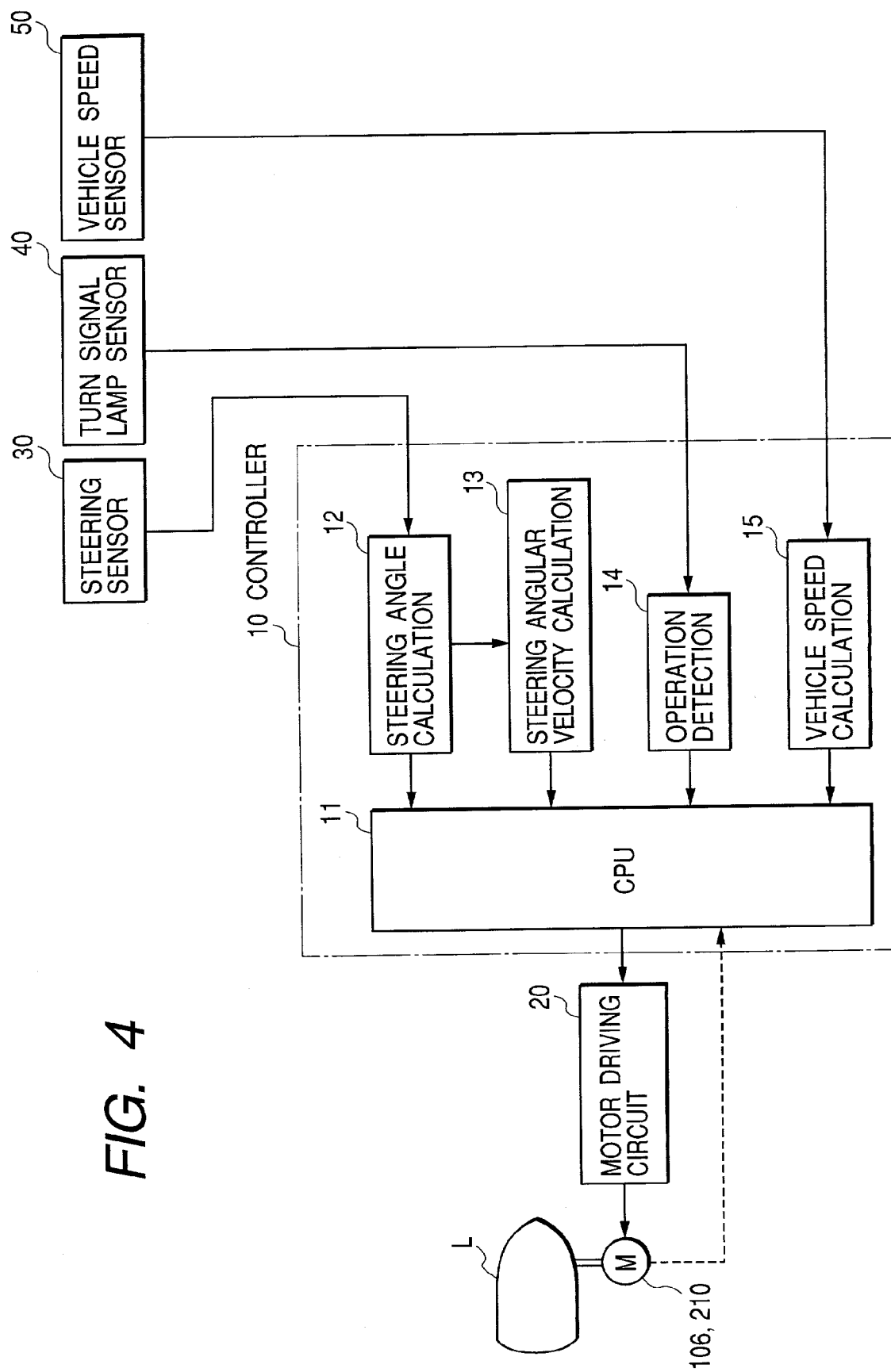
FIG. 4 is a block diagram showing the circuit structure of the lighting apparatus according to the invention.

FIG. 4 is a block diagram showing the circuit structure of a vehicle light apparatus according to the invention in which a lamp L comprising a lighting range control mechanism shown in FIG. 2 or 3 is applied to a headlamp or a fog lamp. A motor M (106, 210) provided in the lighting range control mechanism of the lamp is constituted in such a manner that a rotation is controlled by the supply of a required driving power from a motor driving circuit 20 to be controlled by a controller 10 and a change in a lighting range is thus controlled as described above. The controller 10 inputs the output of a steering sensor 30 provided in a steering wheel of a car and serving to detect the rotating angle of the steering wheel, the output of a turn signal lamp sensor 40 for detecting whether or not the turn signal lamp (winker) of a car carries out a flashing operation, and the output of a vehicle speed sensor 50 for detecting the speed of a car, respectively.

The controller 10 comprises an angle calculating section 12 for calculating, from the output of the steering sensor 30, the steering angle of a car, that is, the angle of the steering wheel which is closely related to a steering angle in the straight running direction of the car, and an angular velocity calculating section 13 for calculating the change rate of the steering angle thus calculated, that is, an angular velocity. It is assumed that the steering angle is an angle turned in the right or left direction with an angle in the straight running direction set to be zero degree. For example, the right direction is set to be a plus angle and the left direction is set to be a minus angle. Moreover, there is provided a turn signal lamp operation detecting section 14 for detecting whether or not the turn signal lamp is operated, that is, the car is set in such a state as to change a course in response to the output of the turn signal lamp sensor 40. Furthermore, there is provided a vehicle speed calculating section 15 for calculating the speed of a car in response to the output of the vehicle speed sensor 50. Each of the outputs of the angle calculating section 12, the angular velocity calculating section 13, the turn signal lamp operation detecting section 14 and the vehicle speed calculating section 15 is sent to a central processing unit (CPU) 11 and the CPU 11 serves to set the lighting range of the lamp L based on these information and to send a control signal to the motor driving circuit 20 based on the setting. The CPU 11 includes an angular velocity comparing function of comparing an angular velocity input from the angular velocity calculating section 13 with a preset velocity and a vehicle speed comparing function of comparing the vehicle speed input from the vehicle speed calculating section 15 with a preset speed. When the lighting range of the lamp L is to be set in the CPU 11, moreover, the rotating angle position of the motor M provided in the lamp L may be fed back as information about a current lighting range set in the lamp, for example, information about the direction of an optical axis as shown in a broken line of FIG. 4.

Figure 5A:
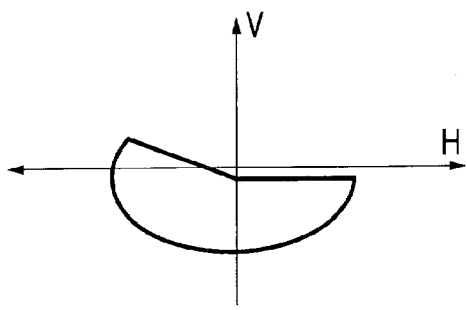
FIGS. 5A and 5B are light distribution characteristic charts in the case of application to a headlamp.
Figure 6:
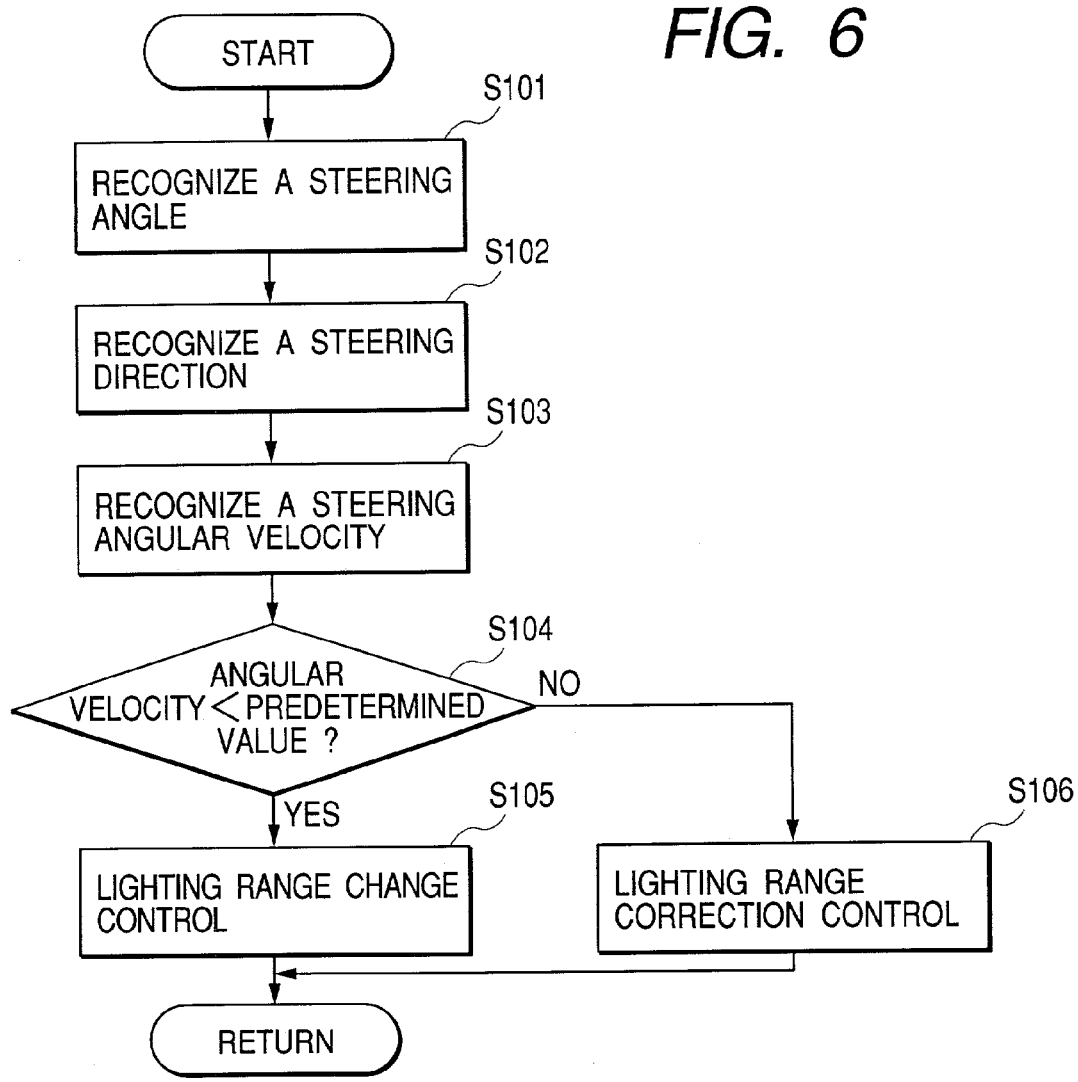
FIG. 6 is a flow chart for explaining a lighting range control operation.

Description will be given to an operation for controlling a lighting range in the lighting apparatus having the above-mentioned structure. First of all, description will be given to the case in which a projector type lamp shown in FIG. 2 is constituted as a headlamp. FIG. 5A is a light distribution characteristic chart indicating a lighting range in a normal condition with the low beam of the headlamp, resulting in a light distribution in a lighting area in which a right half is downward stepped in a straight running direction. FIG. 6 is a flow chart for explaining a control operation, and FIG. 7 is a chart showing a correlation between a steering angle and the optical axis of a lamp which is changed by a lighting range control mechanism. In FIG. 6, first of all, a steering angle calculated from the output of the steering sensor 30 by the angle calculating section 12 is recognized (S101). Then, whether a steering direction, that is, a current steering angle position is present in a right steering area (steering in a right direction) or a left steering area (steering in a left direction) is recognized based on a change in the steering angle (S102). Furthermore, a steering angular velocity calculated by the angular velocity calculating section 13 based on the steering angle is recognized (S103), and the steering angular velocity thus recognized is compared with a preset value (S104). If the steering angular velocity is smaller than a predetermined value, a running condition in which a steering wheel is rotated slowly is set. Therefore, the CPU 11 executes the lighting range change control of the lamp according to the steering angle based on the steering angle and the steering direction which are thus recognized (S105).

In the lighting range change control, the lighting direction of the lamp, that is, the direction of the optical axis of the lamp is set and the motor control circuit 20 is driven to turn the lamp into the direction of the optical axis thus set, thereby executing the lighting direction change control. A characteristic in a lighting direction with respect to a steering angle in this case is shown in a solid line A of FIG. 7. In an example of FIG. 7, a so-called play is given and a change control is not carried out before a predetermined angle, that is, 30 degrees in this example is exceeded in a transverse direction from zero degree at which the steering angle is set into a straight running direction, and the change control in a lighting direction is executed for an area exceeding 30 degrees. In the case in which the steering angle is slightly changed during straight running, consequently, the optical axis of the lamp can be prevented from being changed.

Figure 5B:
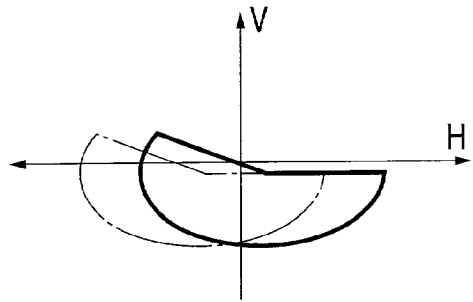
Figure 8A:
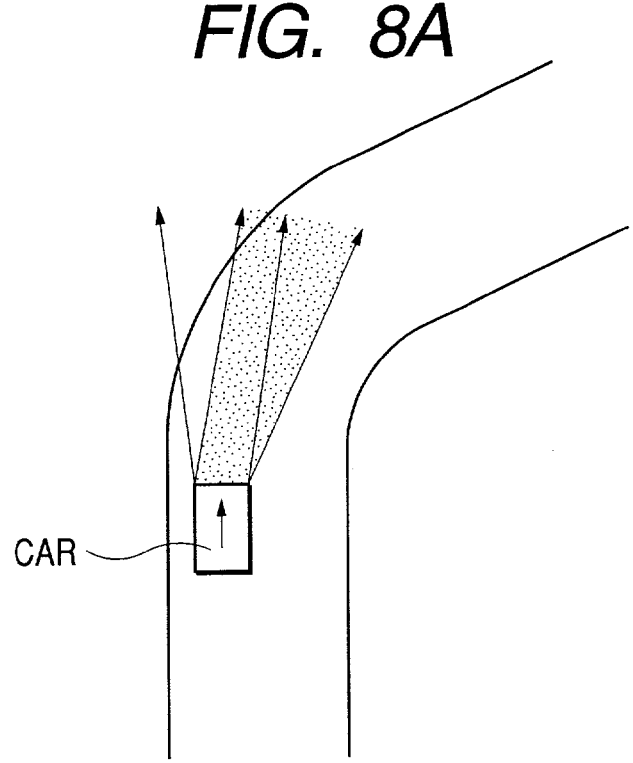
FIGS. 8A and 8B are views for explaining a lighting range on a curved road.
Figure 8B:
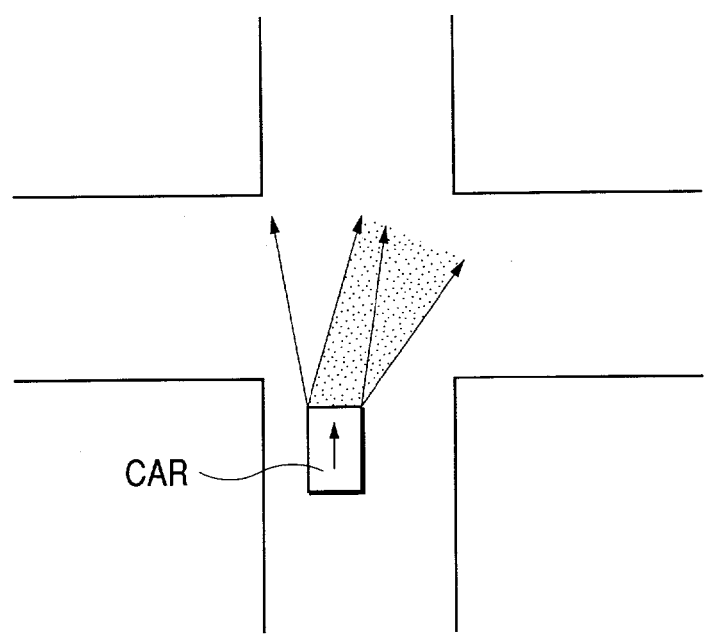

When the steering angle exceeds 30 degrees, the projector type lamp 110 is tilted in a transverse direction in the lamp housing 103 by the rotation control of the motor M (106), the direction of the optical axis of the lamp is changed into such a direction as to follow the steering angle as shown in a solid line Al of FIG. 7, and the direction of the optical axis of the lamp is linearly changed with a characteristic having a tilt angle which is 30 degrees on the right when the steering angle is 140 degrees. FIG. 5B is a view showing a state in which the direction of the optical axis of the lamp is thus changed, in which a deflection in a right direction is shown in a solid line and a deflection in a left direction is shown in a chain line. As shown in FIGS. 8A and 8B, accordingly, the direction of the optical axis of a headlamp is turned in the running direction of a car according to the steering angle as is dotted in each drawing during the running of the car CAR on a curved road or right and left turns on an intersection road, which is preferable for maintaining safe running. As is apparent from FIG. 7, the direction of the optical axis of the lamp is linearly changed at a predetermined tilt angle and the maximum angle of the direction of the optical axis of the headlamp is preset to 30 degrees for left and right in this example. After a point Ax at which the maximum angle is reached, the direction of the optical axis of the lamp is not changed even if the steering angle is increased. When the steering is operated in an opposite direction, the steering angle position for the operation is returned along the solid line A1 when the direction of the optical axis of the lamp is present on the solid line A1, the steering angle position is returned with a characteristic having the same tilt angle as that of the solid line A1 from the position between points Ax and Ay on the maximum angle in the direction of the optical axis of the lamp, the steering angle position is returned to the point Ay with the maximum angle held when the direction of the optical axis of the lamp is present in a position in which the steering angle is greater than that of the point Ay on the maximum angle in the direction of the optical axis of the lamp, and the steering angle position is returned along a solid line A2 of the same tilt angle characteristic as that of the solid line A1 after the point Ay in FIG. 7.

On the other hand, if the steering angular velocity is greater than a predetermined value in the step S104 of FIG. 6, it is possible to suppose a running condition in which a steering wheel is rotated quickly, for example, a running condition in which a right turn is made on a curved road having a small radius of curvature or an intersection road having a small width. In this case, it is preferable that the course of a car should be illuminated earlier than the steering operation. Then, a lighting range correction control is executed (S106). The lighting range correction control serves to increase a change angle in the lighting direction of a lamp for a steering angle, that is, the direction of the optical axis of the lamp to obtain a linear characteristic having a great tilt angle as shown in a broken line B of FIG. 7, thereby greatly changing the direction of the optical axis of the lamp with a small steering angle. More specifically, when the steering angle exceeds 30 degrees, the tilt angle at which the direction of the optical axis of the lamp has a maximum angle of 30 degrees with a steering angle of 120 degrees as shown in a broken line B1 is changed with a greater characteristic than that of the solid line A1. By carrying out the lighting range correction control, the angle in the lighting direction is rapidly changed in a running condition in which right and left turns are made on a curved road having a small radius of curvature or an intersection road having a small width. When a driver is to visually confirm a running direction earlier than an operation for setting the steering angle to an object angle, the running direction of the turn can be illuminated suitably so that safety running can be enhanced still more.

In the case in which the steering angle is to be increased, and furthermore, is to be decreased as is apparent from FIG. 7, that is, the straight running direction is to be returned into the straight running direction, the lighting range correction control is carried out in the same manner. Also in this case, when the steering angular velocity is smaller than a predetermined value, an operation for turning the direction of the optical axis of the lamp into the straight running direction is carried out at a normal speed corresponding to the steering angle as in the characteristic shown in the solid line A of FIG. 7. When the steering angular velocity is greater than the predetermined value, the operation for rapidly turning the direction of the optical axis of the lamp into the straight running direction is executed with a characteristic in which the change angle in the direction of the optical axis of the lamp for the steering angle is increased as in the characteristic shown in the broken line B of FIG. 7. More specifically, when the position of the steering angle for the operation is placed on the broken line B1, it is returned along the broken line B1. When the direction of the optical axis of the lamp is present between points Bx and By (which is the same as Ay) having maximum angles, the position of the steering angle is returned from that position with a characteristic having the same tilt angle as that of the broken line B1. When the direction of the optical axis of the lamp is present in a position having a greater maximum steering angle than that of the point By, the position of the steering angle is returned to the point By with the maximum angle held. After the point By, the position of the steering angle is returned along a broken line B2 having the same tilt angle characteristic as that of the broken line B1. Moreover, when the direction of the optical axis of the lamp is present at a position in an area on the solid line A1 or between the solid lines A1 and A2, the position of the steering angle is returned along a broken line B3 having the same tilt angle characteristic as that of each of the broken lines B1 and B2. In any case, the direction of the optical axis of the lamp is turned into the straight running direction before the steering angle is returned to zero (the straight running direction). Thus, an illumination is carried out early in the straight running direction of the car after the right and left turns are made. Consequently, in the case in which the car runs on an S-shaped road, for example, right steering is carried out on a first curve and left steering is carried out on a next curve, the direction of the optical axis of the lamp in the left steering can be turned early into a left running direction, thereby carrying out the illumination.

FIG. 9 is a flow chart showing a variant of the control operation of a lighting range in the projector type lamp. In the same manner as in the embodiment, a steering angle is recognized based on the output of a steering sensor (S201) and a steering direction is recognized (S202). Then, the CPU 11 detects the output of the turn signal lamp sensor 40 (S203) and decides the operation state of the turn signal lamp (S204). Subsequently, a vehicle speed calculated from the output of the vehicle speed sensor 50 by the vehicle speed calculating section 15 is recognized (S205) and compares the vehicle speed with a predetermined speed (S206). When the turn signal lamp is not operated or the vehicle speed is higher than the predetermined speed, it is decided that a running condition in which a car does not make right and left turns is set and the CPU 11 executes a lighting range change control (S207). The lighting range change control is the same as that in the embodiment and the projector type lamp 110 is tilted in a transverse direction in the lamp housing 103 and the direction of the optical axis of the lamp is turned into such a direction as to follow the steering angle as in the characteristic shown in the solid line of FIG. 7. When the turn signal lamp is set in an operation state, that is, the car is set in such a state as to change a course and the vehicle speed is higher than the predetermined speed, it is decided that the car is set in such a running condition as to change a lane.

On the other hand, when the turn signal lamp is operated and the vehicle speed is equal to or lower than the predetermined speed, it is decided that the car is set in such a condition as to make the right or left turn. In such a running condition, the driver often confirms the course of the car earlier than the steering operation. Therefore, it is preferable that an illumination should be carried out more rapidly than usual with respect to the steering angle and the lighting range correction control is executed (S208). The lighting range correction control is the same as that of the embodiment and serves to increase a change angle in the lighting direction, that is, the direction of the optical axis of a lamp with respect to the steering angle and to greatly change the direction of the optical axis of the lamp with a small steering angle. By carrying out the correction control, the direction of the optical axis of the lamp is changed more rapidly than usual with respect to the steering angle in a running condition in which a right or left turn is made on an intersection road. Consequently, when the driver is to confirm the running direction earlier than the steering operation, the turned running direction can be illuminated suitably so that the safe running can be enhanced still more. In the embodiment, the steering direction to be the running direction of the car is not recognized based on the steering angle described above but can also be recognized by utilizing the output of the turn signal lamp sensor 40.

The foregoing is the same as in the case in which the project or type lamp is used as a fog lamp. The light distribution characteristic of the lamp in this case is shown in FIGS. 10A and 10B. More specifically, when the direction of the optical axis of the fog lamp is deflected in a transverse direction corresponding to the steering angle, and furthermore the steering angular velocity is greater than a predetermined value or the turn signal lamp is operated so that the vehicle speed is lower than a predetermined speed, the lighting range correction control is executed in any case, the deflection of the optical axis of the lamp is carried out more rapidly than the steering operation and the course is rapidly illuminated on a curved road or an intersection road so that a driver can maintain safe running.

Next, description will be given to the case in which the reflector type lamp shown in FIG. 3 is constituted as a headlamp. FIG. 11A is a light distribution characteristic chart showing a lighting range in a normal condition with the low beam of the headlamp, resulting in a light distribution in a lighting area in which a right half is downward stepped in a straight running direction (in Japan). Also in the embodiment, a lighting range change control is executed based on the flow chart of FIG. 6. In the embodiment, the CPU 11 sets the lighting area of the lamp, that is, the light distribution characteristic of the lamp as the lighting range change control of the step S105, and drives the motor control circuit 20 to obtain the light distribution characteristic thus set. Consequently, the subreflector 207 is tilted by the motor M (210) in the lamp L and the direction of reflection of a light emitted from a light source and reflected by the subreflector 207 is changed. Therefore, the lighting area of the whole lamp is changed. In this case, as shown in FIG. 11B, the lighting area is enlarged rightwards (a characteristic shown in a solid line of FIG. 11B) or the lighting area is enlarged leftwards (a characteristic shown in a chain line of FIG. 11B). The lighting area to be enlarged is increased with an increase in the steering angle. For this reason, a central optical axis is deflected in a right direction in the whole lamp. As a result, the characteristic shown in a solid line of FIG. 7 is obtained. In the same manner as in the embodiment, consequently, the optical axis of the headlamp is turned in the running direction of a car according to the steering operation during the running of the car on a curved road or right and left turns on an intersection road, which is preferable for maintaining the safe running.

In the same manner, moreover, the lighting range correction control S106 shown in FIG. 6 is executed when the steering angular velocity is greater than the predetermined value, or the lighting range correction control 208 shown in FIG. 9 is executed when the turn signal lamp is operated and the vehicle speed is lower than the predetermined value. In the lighting range correction control, the lighting area is enlarged in a transverse direction more rapidly than usual with respect to the steering angle. Consequently, a course on a curved road or an intersection road can be illuminated rapidly and a driver can maintain the safe running.

Also in the case in which the reflector type lamp shown in FIG. 3 is constituted as a fog lamp, the same operation is carried out. A normal lighting area shown in FIG. 12A is enlarged in a right direction (a solid line) or a left direction (a chain line) as in FIG. 12B according to a steering angle.

In the case in which the car runs at a predetermined vehicle speed or less with the turn signal lamp operated, moreover, the lighting area is enlarged more rapidly than usual with respect to the steering angle in the same manner.

Figure 13:
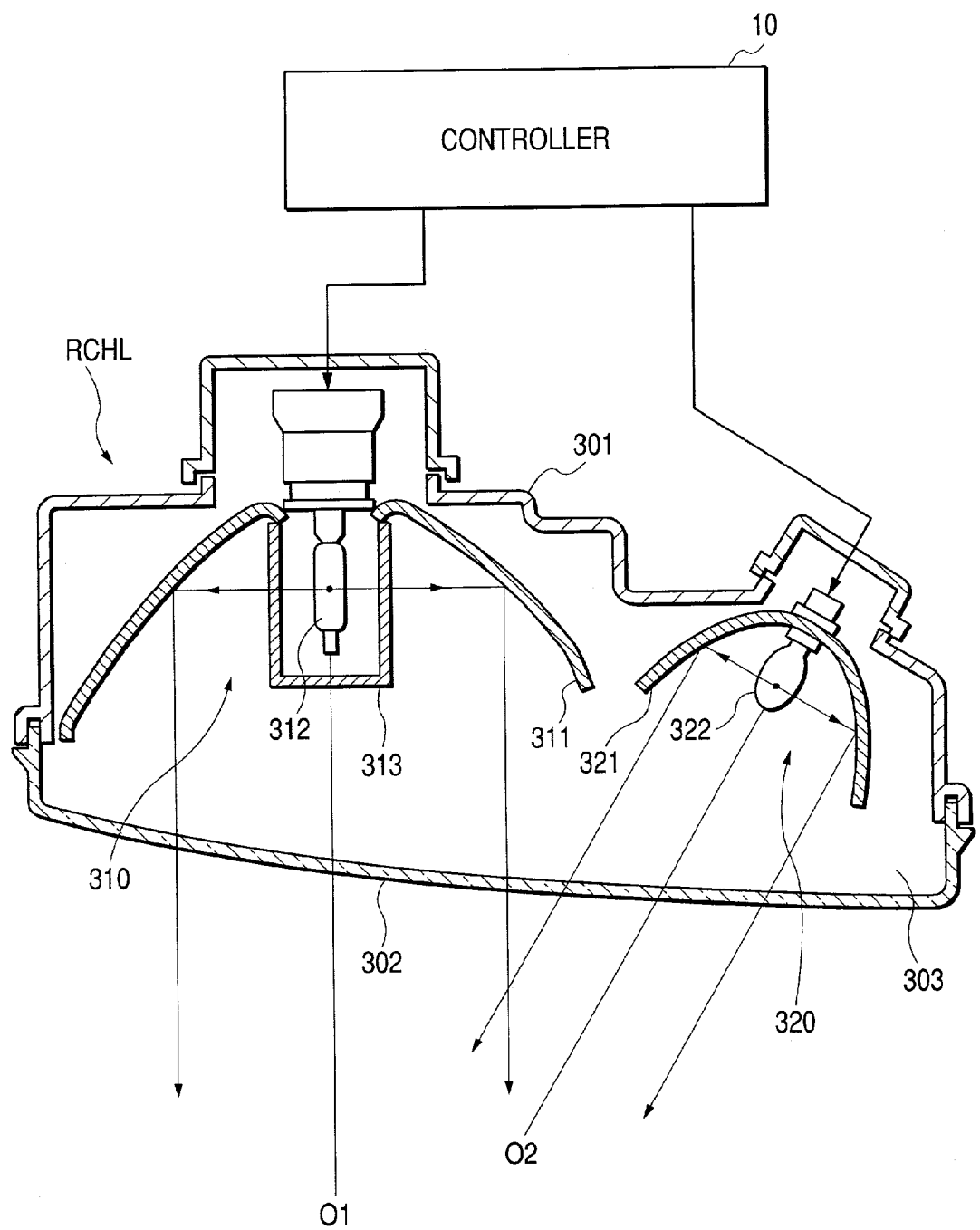
FIG. 13 is a sectional view showing a headlamp according to another embodiment of the invention.

The lamp according to the invention is not restricted to the projector type lamp and the reflector type lamp but the invention can also be applied to a lamp capable of controlling a change in a lighting direction or a lighting area. For example, a lamp shown in FIG. 13 is constituted as a right compound headlamp RCHL of a car in which a plurality of lamps having optical axes turned in different directions are compounded, and a low beam lamp 310 of the headlamp and a lighting direction and area adjusting lamp 320 are provided in a lamp housing 303 constituted by a lighting body 301 and a lens 302. The low beam lamp 310 is the same as a low beam lamp of a conventional headlamp, and comprises a reflector 311, a bulb 312 and a shade 313 and has an optical axis C1 turned in the straight running direction of the car. The lighting direction and area adjusting lamp 320 comprises a reflector 321 and a bulb 322 and has an optical axis O2 turned in a right direction from the straight running direction of the car. The bulbs 312 and 322 of the lamps 310 and 320 are connected to a controller 10 and the ON/OFF and luminance (brightness) of the bulbs 312 and 322 can be controlled by the controller 10. Various sensors are connected to the controller 10 in the same manner as the controller 10 described in each of the embodiments and description thereof will be omitted. Moreover, it is apparent that a left compound headlamp is formed symmetrically, which is not shown.

In the right compound headlamp RCHL, only the low beam lamp 310 is turned on to carry out an illumination in the straight running direction of the car when the steering angle is small. When the steering angle is increased, the lighting direction and area adjusting lamp 320 is also started to be turned on and a brightness thereof is gradually increased with an increase in a steering angle, while the brightness of the low beam lamp 310 is reduced. Consequently, the illumination is carried out in such a state that a light emitted from the low beam lamp 310 and turned in the straight running direction and a light emitted from the lighting direction and area adjusting lamp 320 and turned in the right direction are integrated. As a result, the lighting direction for the right compound headlamp RCHL is changed in the right direction. At this time, moreover, the lighting area of the low beam lamp 310 partially overlaps with the lighting area of the lighting direction and area adjusting lamp 320. Therefore, the lighting area is changed in an enlarging direction. According to circumstances, when the lighting direction and area adjusting lamp 320 is turned on, the low beam lamp 310 may be turned off. In this case, an illumination is carried out by only the lighting direction and area adjusting lamp 320 in the lighting area of the right compound headlamp RCHL. When the lighting areas of the low beam lamp 310 and the lighting direction and area adjusting lamp 320 are equal to each other, it is also possible to change only the lighting direction without changing the lighting area of the right compound headlamp RCHL.

While the example in which a steering angle and an angular velocity are detected by a steering sensor for detecting the rotating angle of a steering wheel has been described in the embodiments, other sensors can also be utilized if a steering angle of a steering wheel or a steering device can be detected.

As described above, the vehicle light apparatus according to the invention controls a change in the lighting direction or the lighting area of the lamp according to the steering angle, and furthermore, decides the running condition of the vehicle based on the steering angular velocity, the operation state of the turn signal lamp and the vehicle speed, thereby rapidly controlling a change in the lighting direction or the lighting area of the lamp in the running direction. In particular, in the case in which the running direction of the vehicle is to be changed, therefore, the running direction can be illuminated prior to the steering angle. Consequently, the invention is very effective for maintaining the safe running of the vehicle on a curved road and an intersection.

What is claimed is:

1. A vehicle light apparatus comprising:
   lighting means which illuminates forward of the vehicle; and
   lighting range control means which changes a lighting range of said lighting means in response to a steering angle of the vehicle, and controls the lighting range of said lighting means in response to a steering angular velocity of the vehicle, wherein:
   when the steering angular velocity is less than a predetermined value, the lighting range control means is set to change the lighting range of the lighting means between a first value and a second value at a first speed; and
   when the steering angular velocity is greater than a predetermined value, the lighting range control means is set to change the lighting range of the lighting means between the first value and the second value at a second speed greater than the first speed.

2. A vehicle light apparatus comprising:
   lighting means which illuminates forward of the vehicle; and
   lighting range control means which changes a lighting range of said lighting means in response to a steering angle of the vehicle, and controls the lighting range of said lighting means in response to a steering angular velocity of the vehicle, wherein:
   when the steering angular velocity is less than a predetermined value, the lighting range control means is set to change an angle of the lighting direction of the lighting means between a first value and a second value at a first speed; and
   when the steering angular velocity is greater than a predetermined value, the lighting range control means is set to change the angle of the lighting direction of the lighting means between the first value and the second value at a second speed greater than the first speed.

3. A vehicle light apparatus comprising:
   lighting means which illuminates forward of the vehicle; and
   lighting range control means which changes a lighting range of said lighting means in response to a steering angle of the vehicle, and controls the lighting range of said lighting means in response to a steering angular velocity of the vehicle, wherein:
   the lighting range control means serves to control at least one of a lighting direction and a lighting area of the lighting means, thereby controlling the lighting range:
   when the steering angular velocity is less than a predetermined value, the lighting range control means is set to change the lighting range of the lighting means between a first value and a second value at a first speed; and
   when the steering angular velocity is greater than a predetermined value, the lighting range control means is set to change the lighting range of the lighting means between the first value and the second value at a second speed greater than the first speed.

4. A vehicle light apparatus comprising:
   lighting means which illuminates forward of the vehicle; and
   lighting range control means which changes a lighting range of said lighting means in response to a steering angle of the vehicle, and controls the lighting range of said lighting means in response to a steering angular velocity of the vehicle, wherein:
   the lighting range control means serves to control at least one of a lighting direction and a lighting area of the lighting means, thereby controlling the lighting range;
   when the steering angular velocity is less than a predetermined value, the lighting range control means is set to change an angle of the lighting direction of the lighting means between a first value and a second value at a first speed; and
   when the steering angular velocity is greater than a predetermined value, the lighting range control means is set to change the angle of the lighting direction of the lighting means between the first value and the second value at a second speed greater than the first speed.

5. A vehicle light apparatus comprising:
   lighting means which illuminates forward of the vehicle;
   turn signal lamp operation detecting means for detecting whether or not the turn signal lamp is in operation; and
   lighting range control means which changes a lighting range of said lighting means, wherein:
   when the turn signal lamp is in operation, the lighting range control means changes the lighting range of said lighting means in response to a steering angle of the vehicle and a vehicle speed; and
   when the turn signal lamp is not in operation, the lighting range control means changes the lighting range of said lighting means in response to the steering angle, but not the vehicle speed.

6. The vehicle light apparatus according to claim 5, wherein the lighting range control means serves to control at least one of a lighting direction and a lighting area of the lighting means, thereby controlling the lighting range.

7. The vehicle light apparatus according to claim 5, wherein the lighting range control means is set to increase a change angle of the lighting range of the lighting means for a change in the steering angle when the turn signal lamp is in operation as compared with the case in which it is not in operation.

8. The vehicle light apparatus according to claim 7, wherein the lighting range control means stops an operation for increasing a change angle of the lighting range when a speed of the vehicle is equal to or higher than a predetermined speed.

9. The vehicle light apparatus according to claim 6, wherein the lighting range control means is set to increase a change angle of the lighting direction of the lighting means for a change in the steering angle when the turn signal lamp in operation as compared with the case in which it is not in operation.

10. The vehicle light apparatus according to claim 9, wherein the lighting range control means stops an operation for increasing a change angle of the lighting direction when a speed of the vehicle is equal to or higher than a predetermined speed.

11. The vehicle light apparatus according to claim 5, wherein the lighting range control means is set to increase a change speed of the lighting range of the lighting means for a change in the steering angle when the turn signal lamp is in operation as compared with the case in which it is not in operation.

12. The vehicle light apparatus according to claim 11, wherein the lighting range control means stops an operation for increasing a change speed of the lighting range when a speed of the vehicle is equal to or higher than a predetermined speed.

13. The vehicle light apparatus according to claim 6, wherein the lighting range control means is set to increase a change speed of the lighting area of the lighting means for a change in the steering angle when the turn signal lamp is in operation as compared with the case in which it is not in operation.

14. The vehicle light apparatus according to claim 13, wherein the lighting range control means stops an operation for increasing a change speed of the lighting area when a speed of the vehicle is equal to or higher than a predetermined speed.

15. The vehicle light apparatus according to claim 5, wherein the lighting range control means is set to increase a change angle of the lighting range of the lighting means for a change in the steering angle when the speed of the vehicle is less than a predetermined speed, as compared with the case in which the speed of the vehicle is greater than the predetermined speed.

16. The vehicle light apparatus according to claim 5, wherein the lighting range control means is set to increase a change speed of the lighting range of the lighting means for a change in the steering angle when the speed of the vehicle is less than a predetermined speed, as compared with the case in which the speed of the vehicle is greater than the predetermined speed.

17. The vehicle light apparatus according to claim 2, wherein the angle of the lighting direction of the lighting means is changed between the first value and the second value in a linear manner when the steering angular velocity is less than the predetermined value and when the steering angular velocity is greater than the predetermined value.

18. The vehicle light apparatus according to claim 4, wherein the angle of the lighting direction of the lighting means is changed between the first value and the second value in a linear manner when the steering angular velocity is less than the predetermined value and when the steering angular velocity is greater than the predetermined value.

19. The vehicle light apparatus according to claim 5, wherein:
- when the turn signal lamp carries out a direction indicating operation, the lighting range control means is set to change an angle of the lighting range of the lighting means between a first value and a second value at a first speed; and
- when the turn signal lamp does not carry out a direction indicating operation, the lighting range control means is set to change the angle of the lighting range of the lighting means between the first value and the second value at a second speed greater than the first speed.

* * * * *